April 13, 1965     L. T. REDDICK     3,178,330
METHOD OF ATTACHING A FITTING TO A FUEL TANK
Filed July 11, 1962     2 Sheets-Sheet 1
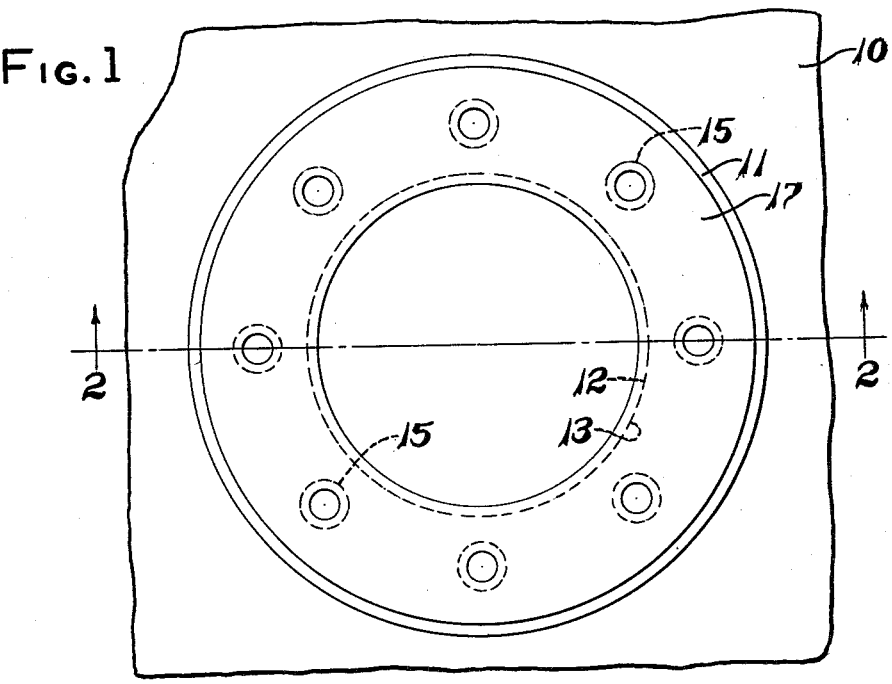
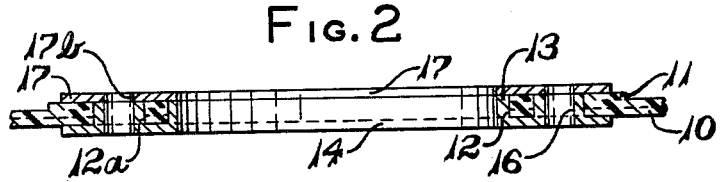
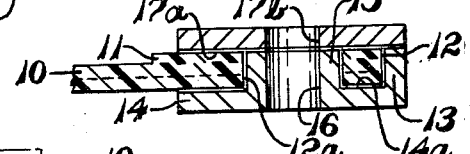
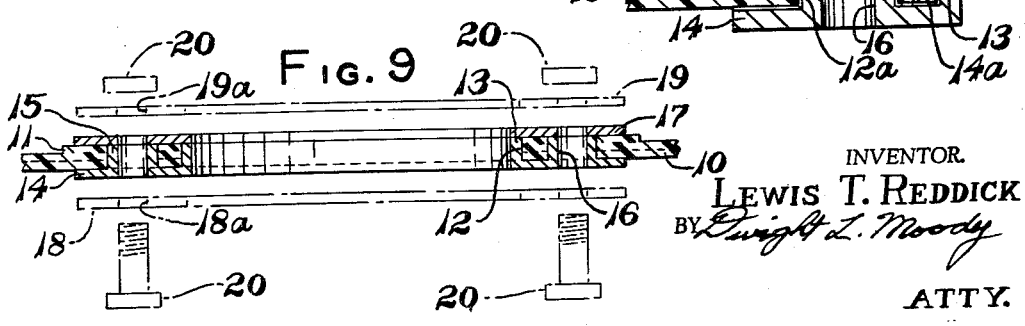
INVENTOR.
LEWIS T. REDDICK
BY
ATTY.

April 13, 1965   L. T. REDDICK   3,178,330
METHOD OF ATTACHING A FITTING TO A FUEL TANK
Filed July 11, 1962   2 Sheets-Sheet 2
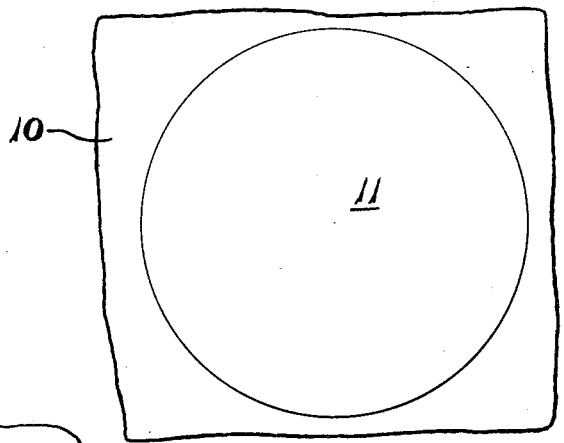
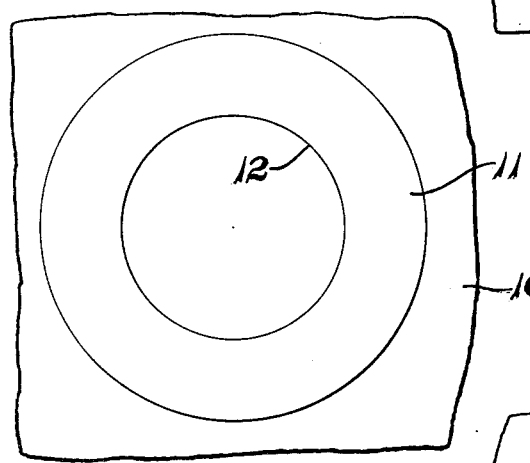
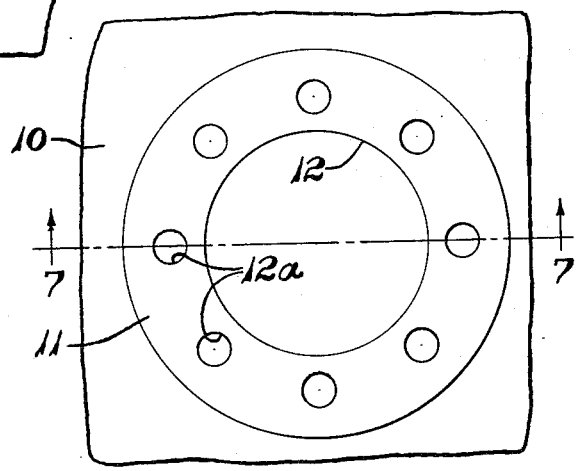
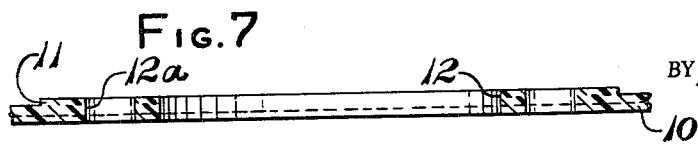
INVENTOR.
LEWIS T. REDDICK
BY Dwight L. Moody
ATTY.

United States Patent Office 3,178,330
Patented Apr. 13, 1965

3,178,330
METHOD OF ATTACHING A FITTING TO A FUEL TANK
Lewis T. Reddick, West Covina, Calif., assignor to The B. F. Goodrich Company, New York, N.Y., a corporation of New York
Filed July 11, 1962, Ser. No. 208,996
3 Claims. (Cl. 156—253)

The invention relates to fluid containers and especially to a method of attaching rigid fittings to flexible fluid containers.

Heretofore, it has been the practice to preassemble the rigid members of aluminum alloy, for example, forming the annular fittings for fluid containers such as flexible fuel cells or tanks for aircraft, and attach annular spaced-apart attaching flanges of natural or synthetic rubber with fabric reinforcements therein to the metal members as by a known vulcanization process. This united fitting assembly is next mounted as a unit about the periphery of an opening in an uncured fuel cell of known natural or synthetic rubber and fabric construction by disposing the uncured rubber wall of the fuel cell between and in contact with the spaced, cured rubber, attaching flanges. The uncured flexible fluid container or fuel cell with mounted fitting assembly is then vulcanized in a known manner, whereby the annular fitting is permanently secured to the cured fuel cell. The foregoing procedure is relatively time-consuming, cumbersome, and expensive, and excessive care is required to provide a good attachment of the fitting.

An object of the invention is to provide a simplified and improved procedure for attaching rigid fittings to the walls of flexible fluid containers such, for example, as fuel cells for aircraft. Other objects and advantages of the invention will be apparent from the following description.

In the accompanying drawings which form a part of this specification and in which like numerals are employed throughout to designate like parts:

FIG. 1 is a fragmentary plan view of a cured fluid container having a rigid fitting attached thereto in accordance with and embodying the invention;

FIG. 2 is a cross sectional view taken along line 2—2 of FIG. 1;

FIG. 3 is a sectional view in an enlarged scale of the fluid container and rigid fitting in united relation, parts being broken away;

FIG. 4 is a fragmentary plan view of an uncured fluid container with a reinforcing patch adhered thereto;

FIG. 5 is a view like FIG. 4 but showing a large central opening cut through the wall and patch of a cured container;

FIG. 6 is a view like FIG. 4 but showing a plurality of circumferentially spaced, small diameter holes cut through the wall and patch of the cured container;

FIG. 7 is a sectional view taken along line 7—7 of FIG. 6 showing the cured container wall and reinforcing patch with the cut opening and holes therethrough;

FIG. 8 is a sectional view of superposed inner and outer parts or members of the annular rigid fitting with an adhesive coating on adjacent sides or surfaces of the parts; and FIG. 9 is a sectional view of the cured container wall, the patch and the rigid members of the annular fitting in assembled relation, broken lines showing removable inner and outer annular cover plates with bolt and nut fasteners adapted to apply and maintain pressure on the fitting during cure of the adhesive coating.

A flexible fluid container 10 or fuel cell or tank of the desired shape is built in a known manner and with a known construction including natural and synthetic rubber and other heat-curable fuel-resistant rubber-like materials and fabric reinforcement. A typical construction includes inner and outer layers of nitrile rubber with nylon fabric reinforcement between such layers. A thin reinforcing patch 11 consisting of uncured resilient rubber-like material such, for example, as nitrile rubber may be cemented i.e. adhered as by a liquid nitrile rubber cement to the outer surface of the uncured fuel cell 10 at the location where a rigid fitting (14, 17) of aluminum alloy or stainless steel or other suitable fuel- and corrosion-resistant metal is to be attached. This locally increases the thickness and stiffness of the generally thin wall of the fuel cell to facilitate a good attachment of the fitting and provide increased resistance to pull-out of the fitting. The reinforcing patch 11 is desirably of larger outside dimensions or diameter than the metal fitting and may have an outside configuration in plan generally corresponding to that of the rigid metal fitting; hence for the annular or circular fitting shown in the drawings, the reinforcing patch 11 is circular and initially continuous throughout its area. Subsequent to cementing the reinforcing patch 11 in place, the fuel cell 10 is cured or vulcanized as by heat and pressure in a known manner thereby leaving the resilient reinforcing patch 11 adhesively bonded to and integral with the cured fuel cell wall as shown in FIG. 4.

A large size opening or hole 12 is next cut centrally through the integral patch 11 and wall of the cured fuel cell 10 as shown in FIGS. 5, 6 and 7. The diameter of the opening or hole 12 corresponds to the radially outer diameter of an upright, circumferentially continuous, radially inner flange 13 of preferably an inner part or member 14 of the annular fitting. Thus, the cured rubber and fabric reinforcement such, for example, as nitrile rubber and nylon fabric reinforcement, at the cut edge of the hole is adapted to contact the flange 13 so as to be protected from contact with the contained fuel. Although the invention in its broad aspects is applicable to annular fittings of several known designs, the particular fitting (14, 17) construction shown in the drawings includes the annular inner part 14 having a plurality of circumferentially spaced-apart projections which may be circular support bosses 15 through each of which may extend a bolt hole 16. Each support boss 15 has a flat top and a height equal to that of the flange 13 and a height approximately equal to the thickness of the cured wall of the fuel cell. The flange 13 and support bosses 15 brace annular outer part or member 17 of the fitting so as to resist distortion and breakage of the member 17 when the cured patch and wall are between the inner and outer members 14, 17 as shown especially in FIG. 3.

After the opening or hole 12 has been cut, a plurality of circumferentially spaced-apart, small size holes 12a, as shown in FIG. 6, are then punched or cut through the united patch 11 and wall of the cured fuel cell 10 to receive the projections or support bosses 15. The annular outside surface of the nitrile rubber patch 11 and the corresponding adjacent annular inside surface of the wall of the fuel cell 10 may be subsequently roughened as by buffing and then the buffed areas cleaned as by suction or by an air blast. Said annular inside surface of the fuel cell wall is preferably cured nitrile rubber which is so roughened.

The next step is to clean any foreign material and oil, grease or the like from those sides or surfaces of the annular parts or members 14 and 17 of the rigid fitting which are adjacent or nearest one another when the parts are superposed for attachment to the fuel cell as shown in FIG. 8. The cleaned flat inner side of the annular outer part or member 17 is provided, as by brushing or spraying, with a thin coating or layer 17a of a liquid infusible resin base cement, preferably an air-curing liquid epoxy resin base cement i.e. the cement thermosets at room temperature such as 70° F. and atmospheric pressure and is compatible with the nitrile rubber material of the fuel cell. The rigid outer member 17 is placed, cemented side first, against the buffed surface of the resilient nitrile rubber patch 11 with the bolt holes 17b in the member centered with the holes 12a so as to be aligned subsequently with holes 16 in the inner member 14.

The annular rigid inner part or member 14 has its entire cleaned outer side including all the supporting bosses 15 and the upright flange 13 provided, as by brushing or spraying, with a thin coating or layer 14a of the same liquid epoxy resin base cement as shown in FIG. 8. The inner member 14 can be inserted through an access opening (not shown) in the fuel cell and then placed, cemented side first against the buffed, nitrile rubber inside surface of the fuel cell 10 with the support bosses 15 extending into the small holes in contact with the cut edges of the small holes 12a and the cut edge of the large opening 12 being seated against the radially outer face of the flange 13, as shown in FIGS. 3 and 9. Thus, the cured rubber-like material at the cut edges of the opening 12 and holes 12a contacts the epoxy resin base cement coating 14a on the inner member 14 so as to provide effective bonding and sealing at these edges. Also, the resistance of the attached fitting to pull-out is increased largely due to the excellent bonded attachment obtained.

It is important to apply and maintain mechanical pressure on one metal members so as to press it toward the other member, while thermosetting or curing the cement. As shown in FIG. 9, the inner and outer rigid metal members 14, 17 of the fitting are in register and arranged to be mechanically pressed toward one another, while the epoxy resin base cement is thermosetting or curing at room temperature and atmospheric pressure, so as to assure full contact of the cemented sides or surfaces 14a, 17a of the members 14, 17 with the fuel cell wall and effective bonding and sealing of the said members to the cured fuel cell wall including the patch 11. To this end, a continuous annular rigid cover plate 18 of steel with circumferentially spaced-apart bolt holes 18a therethrough may be disposed against the flat inner side of the rigid inner member 14 within the fuel cell 10 with the bolt holes 18a aligned with the bolt holes 16 in the member 14. A second continuous annular rigid cover plate 19 of steel with similarly spaced bolt holes 19a is placed in contact with the flat outer side of the rigid outer member 17 with the bolt holes 19a aligned with the bolt holes 17b in outer member 17. Then bolt and nut or screw fasteners 20 are used to engage and temporarily hold the annular cover plates 18, 19 in contact with the annular inner and outer members 14, 17 so that when the fasteners 20 are tightened, the cover plates 18, 19 exert peripheral pressure in the axial direction against the rigid members 14 and 17 of the fitting during the air-cure or thermosetting of the epoxy resin base cement e.g. cure at room temperature and atmospheric pressure.

After completing the cure of the epoxy resin base cement, the bolt and nut fasteners 20 and the cover plates 18, 19 are removed leaving the inner and outer rigid members 14 and 17 of the fittings securely bonded to the cured rubber wall of the fuel cell.

It has been found that the foregoing improved method steps produce a secure adhesive attachment of the annular fitting without resort to the expedient of preassembly and vulcanized attachment of its metal parts to supplemental rubber and fabric attaching flanges, and to other mechanical attaching expedients utilized heretofore. Also, the fitting is assembled on and bonded directly to the cured rubber wall of the fuel cell, without requiring any additional curing of the fuel cell. A further advantage of the foregoing procedural steps is that the inner and outer surfaces of the cured rubber fuel cell wall including the cut edges of the opening and holes therein at the reinforcing patch are sealed effectively by the thin layer of cured epoxy resin base cement so that the contained liquid fuel has little or no chance to penetrate the fuel cell wall at the fitting.

Variations may be made without departing from the scope of the invention as it is defined in the following claims.

I claim:
1. A method of attaching an annular rigid fitting to a flexible fluid container which method comprises the steps of:
   (a) forming a flexible fluid container of heat-curable rubber-like material,
   (b) adhering a thin reinforcing patch of heat-curable nitrile rubber to at least the outer surface of a wall of the uncured container,
   (c) heating the container and reinforcing patch under pressure to cure and unite the rubber-like and nitrile rubber materials,
   (d) cutting an opening entirely through the cured wall and patch of the container which opening has a diameter approximately equal to the inside diameter of said annular fitting,
   (e) cutting a plurality of smaller size circumferentially spaced holes entirely through said cured wall and patch adjacent said opening,
   (f) coating one side of an annular metal inner member and one side of an annular metal outer member of said fitting with a liquid epoxy resin base cement which thermosets at room temperature and pressure and is compatible with the cured rubber-like and nitrile rubber materials of the container, said annular inner member at said coated side thereof having an upright continuous flange extending about its radially inner periphery and having a plurality of circumferentially spaced projections,
   (g) placing said inner member with its coated side extending about the periphery of said opening in contact with the inner surface of the said cured wall, the said projections extending into said holes and said flange contacting the cut edge of said opening in the cured wall and patch,
   (h) placing said outer member in superposed registered relation to said inner member with the coated side of the outer member extending about the periphery of said opening in contact with the outer surface of said patch, and
   (i) pressing said inner and outer members of the fitting toward one another and against the cured wall and patch portion between said members, while thermosetting said epoxy resin base cement at room temperature and atmospheric pressure thereby bonding said inner and outer members of the fitting to the said container.

2. A method of attaching an annular rigid fitting to a flexible fluid container which method comprises the steps of:
   (a) forming a flexible fluid container of heat-curable rubber-like material,
   (b) adhering a thin reinforcing patch consisting of heat-curable nitrile rubber to the outer surface of a wall of the uncured container,
   (c) heating the container and reinforcing patch under pressure to cure and unite the rubber-like and nitrile rubber materials,
   (d) cutting an opening entirely through the cured wall and patch of the container which opening has a diameter approximately equal to the inside diameter of said annular fitting,
   (e) cutting a plurality of smaller diameter circumferentially spaced holes entirely entirely through said cured wall and patch adjacent said opening,
   (f) roughening and cleaning the inner and outer surfaces of said cured wall and patch extending about the periphery of said opening,
   (g) coating one side of an annular metal inner member and one side of an annular metal outer member of said fitting with a liquid epoxy resin base cement which thermosets at room temperature and atmospheric pressure and is compatible with the cured rubber-like and nitrile rubber materials of the container, said annular inner member at said coated side thereof having an upright continuous flange extending about its radially inner periphery and having a plurality of circumferentially spaced support bosses with bores therethrough, said annular outer member having a plurality of circumferentially spaced apertures therethrough, (h) placing said inner member with its coated side extending about the periphery of said opening in contact with said roughened inner surface of the said cured wall, the said support bosses extending into said holes in contact with their cut edges and said flange contacting the cut edge of said opening in the cured wall and patch, (i) placing said outer member in superposed registered relation to said inner member with the coated side of the outer member extending about the periphery of said opening in contact with the roughened surface of said patch and with the apertures in said outer member in alignment with said bores in the support bosses, and (j) pressing said inner and outer members of the fitting toward one another and against the cured wall and patch portion between said members, while thermosetting said epoxy resin base cement at room temperature and atmospheric pressure thereby bonding said inner and outer members of the fitting to the said container.

3. A method of attaching an annular rigid fitting to a flexible fluid container which method comprises the steps of:

(a) adhering a thin reinforcing patch consisting of heat-curable rubber-like material to the outer surface of a wall of an uncured flexible fluid container of heat-curable rubber-like material, (b) heating the container and reinforcing patch under pressure to cure and unite the rubber-like materials, (c) cutting an opening entirely through the cured wall and patch of the container which opening has a diameter approximately equal to the inside diameter of said annular fitting, (d) cutting a plurality of smaller size circumferentially spaced holes entirely through said cured flexible wall and patch adjacent said opening, (e) coating one side of an annular metal inner member and one side of an annular metal outer member of said fitting with a liquid epoxy resin shape cement which thermosets at room temperature and pressure and is compatible with the cured rubber-like materials of the container, said inner member at said coated side thereof having an upright continuous flange extending about its radially inner periphery and having a plurality of circumferentially spaced projections, (f) placing said inner member with its coated side extending about the periphery of said opening in contact with the inner surface of the cured wall, the said projections extending into said holes and said flange contacting the cut edge of said opening in the cured wall and patch, (g) placing said outer member in superposed registered relation to said inner member with the coated side of the outer member extending about the periphery of said opening in contact with the outer surface of said patch, (h) disposing annular rigid inner and outer cover plates in contact with said inner and outer members of the fitting, (i) applying mechanical pressure through said cover plates to said inner and outer members in a manner to force the members toward one another and against the cured wall portion between said members of the fitting, while thermosetting said epoxy resin base cement at room temperature and atmospheric pressure, (j) thereafter removing said cover plates leaving said inner and outer members of the fitting bonded to the said container.

References Cited by the Examiner

UNITED STATES PATENTS

| 2,736,356 | 2/56 | Bender et al. | 280—5 |
| 2,900,292 | 8/59 | Coleman et al. | 161—186 |
| 2,957,794 | 10/60 | Shetterly et al. | 156—330 |

EARL M. BERGERT, *Primary Examiner.*